United States Patent
Silvestri (10) Patent No.: US 6,721,573 B2
(45) Date of Patent: Apr. 13, 2004

(54) METHOD AND APPARATUS FOR PROVIDING DISPATCH SERVICES IN A CORDLESS TELEPHONE COMMUNICATION SYSTEM

(75) Inventor: Michael A. Silvestri, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 505 days.

(21) Appl. No.: 09/795,579

(22) Filed: Feb. 28, 2001

(65) Prior Publication Data

US 2002/0119792 A1 Aug. 29, 2002

(51) Int. Cl.[7] .............................. H04Q 7/20; H04J 3/06
(52) U.S. Cl. ...................................... 455/463; 370/516
(58) Field of Search ......................... 455/563; 370/516, 370/522

(56) References Cited

U.S. PATENT DOCUMENTS

2003/0031210 A1 * 2/2003 Harris ..................... 370/516

OTHER PUBLICATIONS

US SN 09/603,099 Filed Jun. 26, 2000; "Radio Telephone System with One–to–Many Dispatch System".

* cited by examiner

Primary Examiner—William Cumming

(57) ABSTRACT

A dispatch service is provided for a cordless communication system. The system includes a dispatch group that includes multiple portable parts (PP's). When an originating PP desires to engage in a dispatch communication, the PP selects a traffic bearer over which to transmit, reserved the selected traffic bearer via a fixed part (FP), and identifies the reserved traffic bearer to the other members of the dispatch group via the FP. The other members tune to the identified traffic bearer and the originating PP begins transmitting. When the originating PP is finished transmitting, the originating PP releases the reserved traffic bearer and another member of the dispatch group may then transmit on the reserved traffic bearer. A handoff is also provided in the event that the signal performance of the reserved traffic bearer degrades to an unacceptable level and an acceptable traffic bearer is available.

27 Claims, 8 Drawing Sheets

METHOD AND APPARATUS FOR PROVIDING DISPATCH SERVICES IN A CORDLESS TELEPHONE COMMUNICATION SYSTEM

FIELD OF INVENTION

The present invention relates generally to cordless telephone communication systems, and in particular to providing dispatch services in a cordless telephone communication system.

BACKGROUND OF THE INVENTION

Cordless telephone systems provide low-power two-way wireless communications over a very limited distance, such as 300 to 600 feet. A communication unit, or portable part (PP), is connected to a telecommunication network, such as a Public Switched Telephone Network (PSTN), via a base station, or radio fixed part (RFP), that is connected to an external telephone line. The RFP provides communications services to the PP, receiving communications from the telecommunication network and modulating the received communications onto an RF signal for transmission to the PP. The PP in turn communicates with the telecommunication network via the RFP, transmitting RF signals to the RFP that the RFP demodulates and transmits over the telecommunication network. The two primary systems covering the design of a digital cordless telephone system and protocols used by such a system are Digital Enhanced Cordless Telecommunications (DECT) and Personal Wireless Telecommunications (PWT).

In a business environment, the RFP may provide communications services to multiple PP's, thereby reducing the number of external telephone lines required to provide telephone services to each of the PP's. In addition, in a large corporate setting there may be multiple RFP's that together support the multiple PP's, wherein each of the multiple PP's may access a telecommunication network via any one of the multiple RFP's. However, in a digital cordless telecommunication system based on a DECT protocol or a PWT protocol, there is no prescribed method for dispatch communications in which one PP of the multiple PP's may engage in a group communication with one or more of the other PP's and circumvent the telecommunication network.

Therefore, a need exists for a method and apparatus that provides dispatch-type services in a cordless telecommunication system.

DETAILED DESCRIPTION OF THE INVENTION

To address the need for a method and apparatus that provides dispatch-type services in a cordless telecommunication system, a method and apparatus is provided for the establishment of a dispatch call in a cordless communication system. The system includes a dispatch group that includes multiple portable parts (PP's). When one member of the group (i.e., an originating PP) desires to engage in a dispatch communication, the PP selects a traffic bearer over which to transmit, reserved the selected traffic bearer via a fixed part (FP), and identifies the reserved traffic bearer to the other members of the dispatch group via the FP. The other members tune to the identified traffic bearer and the originating PP begins transmitting. When the originating PP is finished transmitting, the originating PP releases the reserved traffic bearer and another member of the dispatch group can then transmit on the reserved traffic bearer. A handoff is also provided in the event that the signal performance of the reserved traffic bearer degrades to an unacceptable level and a better, acceptable traffic bearer is available.

Generally, the present invention provides a method for providing dispatch services in a cordless communication system that includes multiple communication units. The method includes a step of receiving a request to set up a dispatch communication from a first communication unit of the plurality of communication units, wherein the request identifies a traffic bearer for the dispatch communication. The method further includes steps of transmitting a paging message to a second communication unit of the plurality of communication units, wherein the paging message identifies the traffic bearer, transmitting a confirmation message to the first communication unit, wherein the confirmation message authorizes the first communication unit to transmit on the traffic bearer, and transmitting a message via the traffic bearer confirming the use of the traffic bearer for the dispatch communication Another embodiment of the present invention encompasses a method for engaging a first communication unit of multiple communication units in a cordless communication system in a dispatch call with a second communication unit of the multiple communication units. The method includes a step of transmitting a request to set up a dispatch call, wherein the request identifies a traffic bearer for the dispatch communication. The method further includes steps of receiving an authorization to engage in a dispatch communication on the traffic bearer in response to transmitting the request and transmitting on the traffic bearer in response to receiving the authorization.

Another embodiment of the present invention encompasses a method for engaging a communication unit of multiple communication units in a cordless communication system in a dispatch communication. The method includes steps of listening to a dummy bearer allocated for paging messages, receiving a paging message identifying a traffic bearer that is reserved for a dispatch communication, and listening to the traffic bearer in response to receiving the paging message.

Finally, another embodiment of the present invention provides a cordless communication system that includes multiple portable parts that are each in wireless communication with a fixed part. A first portable part of the multiple portable parts transmits a request to set up a dispatch call, wherein the request identifies a traffic bearer for the dispatch communication, receives an authorization to engage in a dispatch communication on the traffic bearer in response to transmitting the request, and transmits on the traffic bearer in response to receiving the authorization. A second portable part listens to a dummy bearer allocated for paging messages, receives a paging message identifying the traffic bearer, and listens to the traffic bearer in response to receiving the paging message. The fixed part receives the request to set up a dispatch communication from the first portable part, transmits the paging message to the second portable that identifies the traffic bearer, transmits a confirmation message to the first portable part that authorizes the first portable part to transmit on the traffic bearer, and transmits a message via the traffic bearer confirming the use of the traffic bearer for the dispatch communication.

Figure 1:
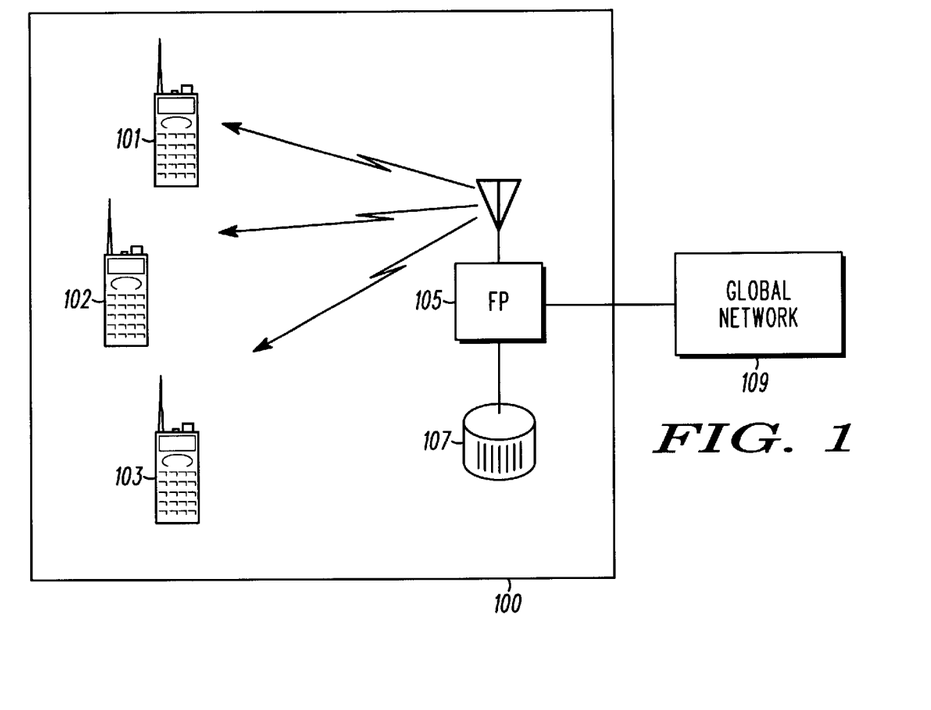
FIG. 1 is a block diagram of a cordless communication system in accordance with an embodiment of the present invention.
Figure 2:
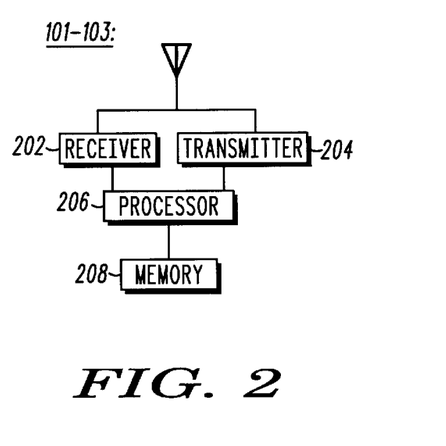
FIG. 2 is a block diagram of a portable part of FIG. 1 in accordance with an embodiment of the present invention.

The present invention can be more fully understood with reference to FIGS. 1–12. FIG. 1 is a block diagram of a cordless communication system 100 in accordance with an embodiment of the present invention. Cordless communication system 100 includes a fixed part (FP) 105 and multiple portable parts (PP's) 101–103 (three shown). As shown in FIG. 2, included in each PP 101–103 is a radio frequency (RF) receiver 202 and an RF transmitter 204 each coupled to a processor 206, preferably a microprocessor. Processor 206 is further coupled to a memory 208 that stores a PP identifier, preferably an alphanumeric sequence, that is uniquely associated with the PP and programs that allow the PP to perform wireless communication functions. Memory 208 may further include a dispatch group identifier, preferably an alphanumeric sequence, that is uniquely associated with a dispatch group of which the PP is a member. In the present invention, each PP 101–103 is modified to further include a push-to-talk (PTT) key. When depressed, the PTT key causes the PP to transmit a reservation request to FP 105 requesting reservation of a traffic bearer for transmissions by the PP.

Figure 3:
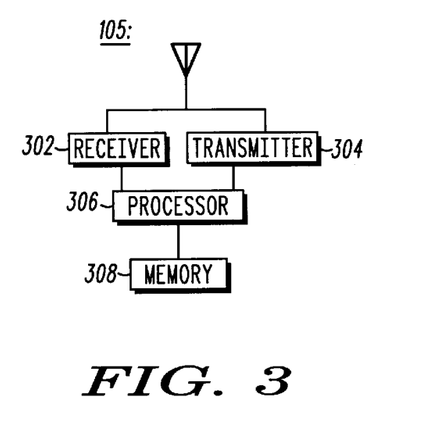
FIG. 3 is a block diagram of a fixed part of FIG. 1 in accordance with an embodiment of the present invention.

In its simplest form, FP 105 includes a base station, or radio fixed part (RFP), that is in RF communication with each PP 101–103. As shown in FIG. 3, FP 105 includes a RF receiver 302 and an RF transmitter 304 each coupled to a processor 306, preferably a microprocessor. Processor 306 is further coupled to a memory 308 that stores an FP identifier, preferably an alphanumeric sequence, that is uniquely associated with FP 105 and programs that allow the FP to perform wireless communication functions. FP 105 is connected to a global network 109, such as a PSTN, a data network such as the Internet, or a wireless communication network such as a Global System for Mobile Communications (GSM) system. FP 105 is further connected to, or alternatively includes, a registration database 107 that stores the PP identifiers of each PP 101–103 included in system 100. Preferably, registration database 107 further includes one or more dispatch group identifiers, wherein each dispatch group identifier is uniquely associated with a dispatch group. Each dispatch group includes multiple PP's, and each group identifier is associated in registration database 107 with the PP identifier of each PP that is a member of the group. Memory 208 of each PP 101–103 stores a group identifier of each dispatch group that includes the PP, or alternatively stores a PP identifier of each PP that is a member of a dispatch group that includes the PP.

In another embodiment of the present invention, FP 105 may include multiple RFP's that are each coupled to a base station controller, or central control fixed part (CCFP), which CCFP is in turn coupled to global network 109. Each of the multiple RFP's is typically linked to the CCFP by twisted pair cables. In yet another embodiment, FP 105 may further include a local network coupled between the CCFP and global network 109. The local network could be a PABX, a local area network (LAN), a multiplexer, or any type of private telecommunication network that provides a connection between cordless system 100 and global network 114.

In order for each PP 101–103 to communicate with FP 105, well-known layered protocols have been established, such as a DECT/PWT protocol stack. The protocols specify the manner of interpreting every data bit of a data packet exchanged between a PP 101–103 and FP 105. By dividing the protocols into multiple layers, the protocols are kept simple, each with a few well-defined tasks. Generally, protocol layering divides the software design of system 100 into functional layers and then assigns separate protocols to perform each layer's task. The DECT/PWT protocol stack includes four layers, which layers are, from highest to lowest, a networking (NWK) layer, a data link control (DLC) layer, a medium access control (MAC) layer, and a physical (PHL) layer. The tasks of each layer, other than the PHL layer, are all performed by the respective processor 206, 306 in each of PP's 101–103 and FP 105 of system 100.

The top layer in the stack, that is the NWK layer, relies on the lower layers to provide a path to exchange data between a NWK layer in one cordless part and a counterpart NWK layer in another cordless part. The NWK layer interfaces with the world external to cordless communication system 100, such as a user of a PP 101–103, or a global network 109 connected to FP 105, via an Interworking Unit (IWU). The IWU converts signals and messages received by a PP 101–103 from a user of the PP, or by FP 105 from global network 109, to a format suitable for processing by cordless communication system 100. The NWK layer also provides services to an application that may be running in a cordless part 101–103, 105, such as organizing an information exchange between the application in a PP 101–103 or FP 105 and an application in a respective FP 105 or PP 101–103. For example, the NWK layer in a PP 101–103 establishes a dispatch call by informing FP 105 which PP's are to be included in the call. The NWK layer includes call control (CC) entities created by the NWK layer to handle calls, a link control entity (LCE), and a mobility management (MM) entity for mobility support.

The DLC layer provides end-to-end data flow management and communication reliability functions. Among the functions performed by the DLC layer is segmentation of long messages received from the NWK layer into suitably sized segments, addition of error control and numbering information to the segment to create a frame, and fragmentation of the frame into fragments that are passed to the MAC layer. The DLC layer also recombines fragments received from the MAC layer into frames and assembles the frames into messages for conveyance to the NWK layer.

The MAC layer is responsible for delivering data across a physical network that interconnects a source of the data and a destination for the data. In response to a request from a DLC layer in a PP or an FP to establish a connection with a respective FP or PP, a MAC layer associated with the requesting DLC layer, in communication with a MAC layer in the opposite part, allocates a traffic bearer for the connection. In one embodiment of the present invention, cordless system 100 is a time division multiple access (TDMA) system in which a frequency channel is divided into multiple frames, and each frame is divided into multiple time slots. Each time slot constitutes a communication channel that can be assigned, singly or in combination with other time slots in a frame, to a PP 101–103 for a communication between the PP and FP 105.

A traffic bearer is a communication medium that includes one or more communication channels that have been assigned to an active communication. A traffic bearer may be a simplex bearer in which data is sent or received in one or more time slots in each frame, or a duplex bearer that is created from an allocation of two simplex bearer in opposite directions, or a wider bandwidth bearer that is created from the allocation of multiple simplex bearers or multiple duplex bearers. Although the present invention is described herein in a context of a TDMA communication system, those of ordinary skill in the art realize that the type of communication system in which the present invention operates is not critical to the present invention and that the present invention may operate in any type of communication system, such as a frequency division multiple access (FDMA) or a code division multiple access (CDMA) system, without departing from the spirit and scope of the present invention.

The bottom layer in the DECT/PWT protocol stack, that is, the PHL layer, provides an interface to network hardware. The PHL layer provides the means by which data packets are transmitted and received by each cordless part 101–103, 105 in system 100. The PHL layer divides the RF spectrum into individual radio carriers and prescribes the means by which digital data is modulated onto the radio carriers. Additionally, DECT/PWT systems typically include further elements that handle functions not easily assigned to layers. For example, a typical system includes a lower-layer management entity (LLME) that measures a strength of a signal on a free traffic bearer. The LLME instructs the PHL to measure a signal in a particular traffic bearer and the PHL layer returns a value. The LLME then prepares an ordered list of traffic bearers based on the measurements.

Figure 4:
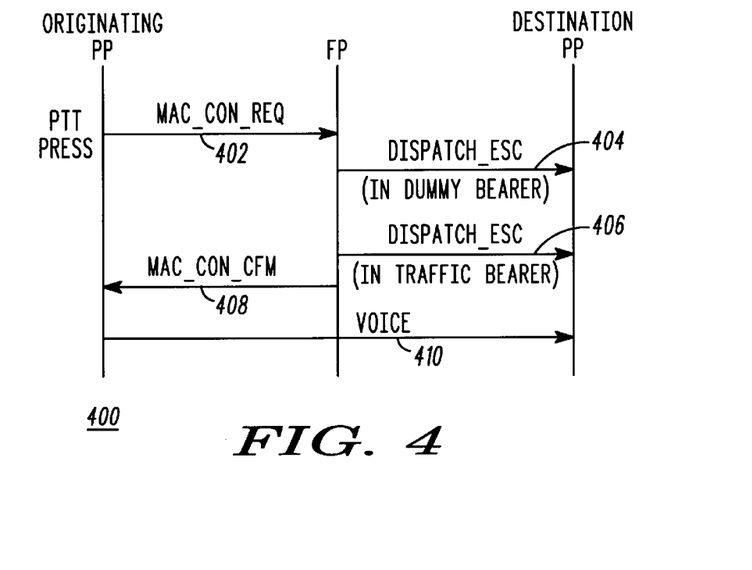
FIG. 4 is a signal flow diagram of a dispatch call setup sequence performed by the cordless communication system of FIG. 1 in accordance with an embodiment of the present invention.

FIG. 4 is a signal flow diagram of a signaling sequence 400 that occurs among the MAC layers of PP's 101–103 and FP 105 of cordless system 100 in order to set up a dispatch call in accordance with an embodiment of the present invention. A PP 101–103 originates a dispatch call in response to a depression of a PP's PTT key by a user of the PP. Depression of the PTT key causes the PP to request a reservation of a traffic bearer for a dispatch call as described below, and continues to reserve the traffic bearer for transmissions by the originating PP for so long as the PTT key continues to be depressed.

A PP (e.g., PP 101) originating a dispatch call reserves a traffic bearer as follows. Depression of the PTT key causes the IWU layer in the originating PP (i.e., PP 101) to convey a message to the NWK layer of PP 101 requesting a link for a dispatch call. In response to receiving the request from the IWU layer, the NWK layer of PP 101 generates a dispatch call service message, preferably a CC SETUP REQ message, requesting that a dispatch call be set up with members of a dispatch group. Preferably, the CC SETUP REQ message includes a group identifier that is stored in memory 208 of PP 101 and is retrieved by the PP's processor 206 from the memory in response to depression of the PTT key. The group identifier corresponds a dispatch group whose members include the originating PP and other PP's (e.g., PP's 102–103) in system 100. Alternatively, instead of including a group identifier, the CC SETUP REQ message may include a PP identifier for each member of the dispatch group other than the originating PP, which PP identifiers are stored in memory 208 of PP 101 and are retrieved by the PP's processor 206 from the memory in response to depression of the PTT key. The CC SETUP REQ message further includes information stored in memory 208 of PP 101 concerning the type of service required for the dispatch call, such as throughput capacity or bandwidth and whether the call is to be simplex or duplex, which information is retrieved from memory 208 by processor 206.

The CC SETUP REQ message is conveyed by the NWK layer of originating PP 101 to the DLC layer of PP 101, and the MAC layer establishes a connection to FP 105. The MAC layer translates the CC SETUP REQ to a request to set up a dispatch call, preferably a MAC CON REQ message, for transmission to FP 105. The MAC CON REQ message includes the PP identifier of originating PP 101, a dispatch group identifier, and an FP identifier associated with the FP providing communication services to PP 101 (i.e., FP 105). Alternatively, instead of a dispatch group identifier, the MAC CON REQ message may include the PP identifiers of the other members of the dispatch group. Preferably, the MAC CON REQ message further identifies a traffic bearer selected by the MAC layer of PP 101 for the dispatch call. The MAC layer of PP 101 then conveys 402 the MAC CON REQ message to a MAC layer of FP 105 via the selected traffic bearer and the PHL layers of PP 101 and FP 105.

The MAC layer of PP 101 selects a traffic bearer based on a radio channel map. The radio channel map includes a signal quality metric, such as signal strength or a carrier-to-interference ratio (C/I), for each time slot available for user information traffic at FP 105. Each signal quality metric is determined by processor 206 of PP 101, preferably the PHL layer in response to instructions from the LLME, based on signals received by PP 101 from FP 105. The LLME then prepares an ordered list, or a radio channel map, based on the signal quality metric determinations. When the MAC layer of originating PP 101 receives the CC SETUP REQ, the MAC layer selects a traffic bearer for the dispatch call by reference to the radio channel map. Preferably, the MAC layer selects one or more time slots that are not in use and that correspond to the most favorable signal quality metrics.

FP 105 continuously monitors the communication channels available for user information traffic in system 100. In response to receiving the MAC CON REQ message from originating PP 101, FP 105 reserves the traffic bearer identified in the MAC CON REQ message, informs the other members of the dispatch call group of the reserved traffic bearer, and authorizes PP 101 to transmit on the reserved traffic bearer.

Figure 5:
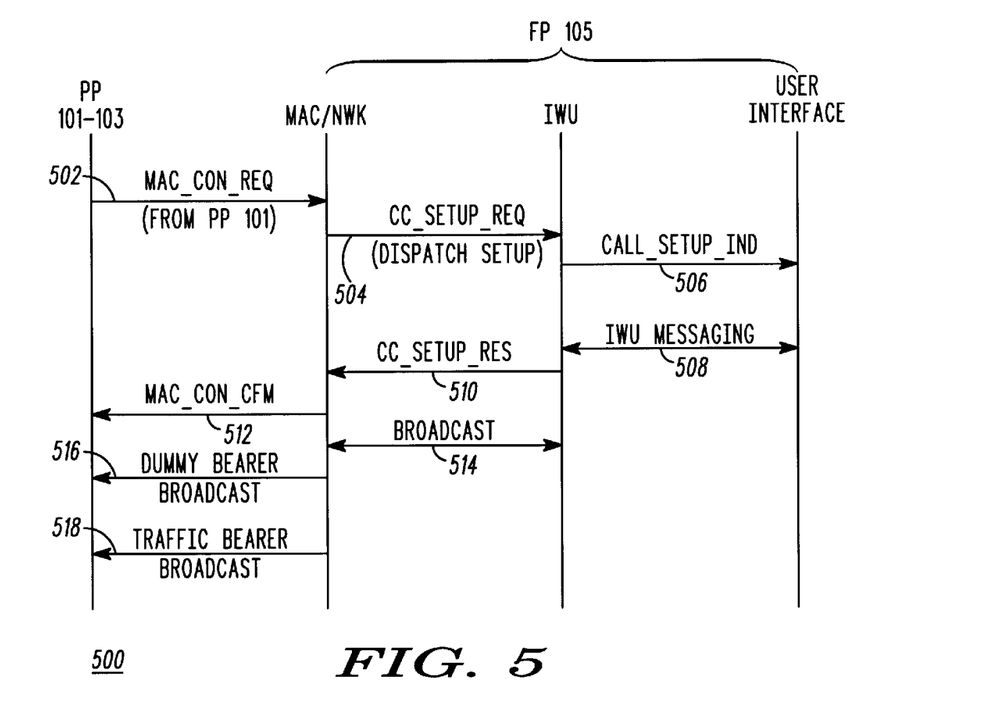
FIG. 5 is a signal flow diagram of a dispatch call setup sequence performed by a fixed part of FIG. 1 in accordance with an embodiment of the present invention.

FIG. 5 is a signal flow diagram of a dispatch call setup sequence 500 performed by FP 105 in accordance with an embodiment of the present invention. Upon receiving 502 the MAC CON REQ message, the MAC layer of FP 105 translates the MAC CON REQ message to the CC SETUP REQ message and conveys the CC SETUP REQ message to a NWK layer of FP 105. Based on the group identifier included in the CC SETUP REQ message, a PP identifier corresponding to each member of the dispatch group is retrieved by processor 306 of FP 105 from registration database 107.

When FP 105 confirms that the requested channel is available, the FP generates a paging message, preferably a BROADCAST message that is translated to a DISPATCH ESC message by the DLC layer of FP 105. The paging message includes the group identifier corresponding to the dispatch group that includes PP 101 and identifies the reserved traffic bearer. In an alternative embodiment of the present invention, and with reference to registration database 107, the paging message may include the identifiers of each individual member of the dispatch group instead of including the group identifier, which individual identifiers may or may not include originating PP 101. The DLC layer of FP 105 conveys the paging message to the MAC layer of FP 105 and the MAC layer broadcasts 404, 516 the paging message via a dummy bearer.

Each PP 101–103 serviced by FP 105 listen to the dummy bearer when not involved in an active communication. The dummy bearer can be a predetermined communication channel that is allocated for paging messages when system 100 is designed. Alternatively, the dummy bearer may be one or more data fields in a communication channel that may or may not be currently involved in an active communication. The PP receives the paging message via the dummy bearer. The DLC layer of the PP extracts the PP identifiers or group identifier included in the paging message and conveys the extracted identifier(s) to the NWK layer. Based on the extracted identifier(s), the NWK layer determines whether the paging message is intended for the PP. Upon determining that the paging message includes a PP or group identifier associated with the PP, the PP enters an active receive mode and begins listening to the traffic bearer identified in the paging message.

Preferably, the MAC layer of FP 105 also broadcasts 406, 518 the paging message via the reserved traffic bearer. When a dispatch group member (i.e., PP 102, 103) tunes to the reserved traffic bearer, the group member is able to confirm that it is listening to the correct traffic bearer based on the receipt of the traffic bearer paging message.

In addition to generating a BROADCAST message, FP 105 generates a dispatch call authorization message, preferably a CC SETUP RES message, authorizing the originating PP to proceed with the dispatch call. The MAC layer of FP 105 translates the CC SETUP RES message to a MAC CON CFM message and conveys 512 the MAC CON CFM message to PP 101 via the traffic bearer.

When the MAC layer of PP 101 receives the MAC CON CFM message from FP 105, the MAC layer conveys the MAC CON CFM message to the DLC layer of PP 101. The DLC layer translates the MAC CON CFM message to a CC CONNECT message that is conveyed to the NWK layer of PP 101 and informs the NWK layer that the requested traffic bearer has been reserved for the dispatch call. In response to receiving the CC CONNECT message, the NWK layer of PP 101 produces a signal that is conveyed to the user of PP 101 via a user interface, such as a speaker or a display screen included the PP, and that alerts the user that a dispatch call has been set up and that the user may proceed. PP 101 also enters an active transmit mode, and PP 101 can begin transmitting user information to the other members of the dispatch group via the reserved traffic bearer.

In one embodiment of the present invention, after conveying the MAC CON REQ message to FP 105, PP 101 waits a predetermined period of time for a response from FP 105. When PP 101 fails to receive a response prior to the expiration of the predetermined period of time, the MAC layer reconveys the MAC CON REQ message and again waits the predetermined period of time for a response. PP 101 reconveys the MAC CON REQ message after the expiration of each predetermined period of time during which no response is received until a predetermined number of reconveyances have been made. The number of reconveyances is up to the designer of system 100. When PP 101 fails to establish a connection with FP 105 after reconveying the MAC CON REQ message the predetermined number of times, PP 101 terminates efforts to establish a connection.

In another embodiment of the present invention, instead of or in addition to generating a CC SETUP RES message, FP 105 transmits a call proceeding message, preferably a CC CALL PROC message, to originating PP 101, indicating that the dispatch call is being set up. When the CC CALL PROC message is transmitted in addition to the MAC CON CFM message, the CC CALL PROC message is transmitted during a time period between the transmission of the paging message and the transmission of the MAC CON CFM message. When the CC CALL PROC message is transmitted instead of the MAC CON CFM message, then, in response to receiving the CC CALL PROC message, the NWK layer of PP 101 produces a signal that is conveyed to the user of PP 101 and that alerts the user that a dispatch call has been set up and that the user may proceed. In addition, in response to receiving the CC CALL PROC message, PP 101 enters an active transmit mode and can then begin transmitting user information to the other members of the dispatch group via the reserved traffic bearer.

In still another embodiment of the present invention, an acknowledgment embodiment, each non-originating dispatch group member (i.e., PP's 102–103), or destination PP, transmits an acknowledgment ("ACK") to FP 105 upon receiving the paging message. In the acknowledgment embodiment, FP 105 does not transmit a MAC CON CFM message or a CC CALL PROC message until receiving an ACK from at least one of the non-originating group members.

The ACK acknowledges receipt of the paging message and further includes the PP identifier of the destination PP transmitting the ACK. FP 105 extracts the PP identifier from each ACK and transmits the PP identifier, or a telephone number, telephone extension, or name associated with the PP identifier, to originating PP 101 via the traffic bearer. PP 101 can then compile a list of participating PP's based on the received ACK's. Alternatively, FP 105 may extract and store each PP identifier included in a received ACK and compile a list of participating PP's. After an expiration of a predetermined acknowledgment waiting period, FP 105 may then transmit the list to PP 101, preferably via the traffic bearer.

For example, upon receiving an ACK, FP 105 may extract the PP identifier included in the ACK. Based on the PP identifier, FP 105 retrieves a telephone number, telephone extension, or a name of a party from the PP's profile in registration database 107. The retrieved telephone number, telephone extension, or name is then inserted in an appropriate data field in a MAC CON CFM or CC CALL PROC message that is conveyed by FP 105 to originating PP 101. Upon receiving the MAC CON CFM or CC CALL PROC message, originating PP 101 then displays, on a display screen included in the PP, the telephone number, telephone extension, or name included in the message.

Figure 6:
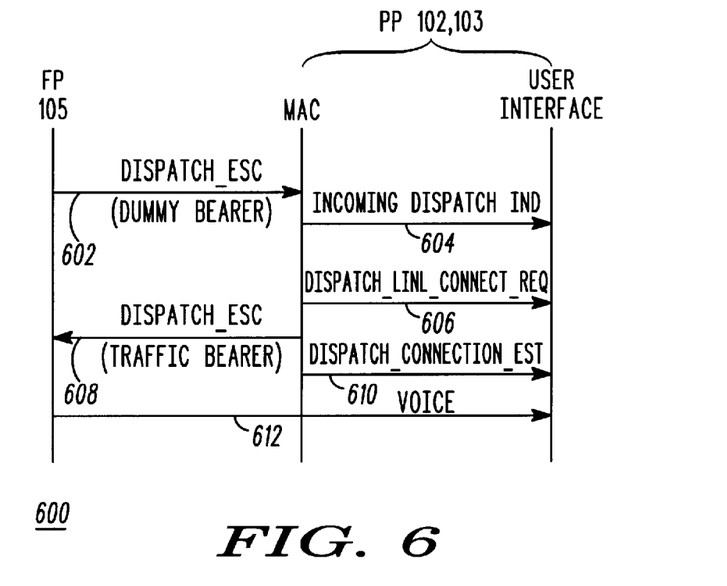
FIG. 6 is a signal flow diagram of a dispatch call setup sequence performed by a portable part of FIG. 1 in accordance with an embodiment of the present invention.

FIG. 6 is a signal flow diagram of a dispatch call setup sequence 600 performed by a destination PP 102, 103 in accordance with an embodiment of the present invention. When the MAC layer of the destination PP receives 602 the paging message (i.e., the DISPATCH ESC message) from FP 105 via the dummy bearer, the MAC layer generates an indicator activation message, preferably an INCOMING DISPATCH IND message, that is conveyed 604 to a higher layer of the destination PP. The INCOMING DISPATCH IND message causes the higher layer to generate an instruction, preferably a DISPATCH LINK CONNECT REQ message, that is conveyed to the MAC layer. The DISPATCH LINK CONNECT REQ message instructs the MAC layer to tune to the traffic bearer identified in the paging message.

Upon receiving 608 the paging message via the identified traffic bearer, the MAC layer of the destination PP produces an indicator activation message, preferably a DISPATCH CONNECTION EST message. The MAC layer of the destination PP then conveys 610 the indicator activation message to the user interface of the destination PP. In response to receiving the indicator activation message, the user interface activates a dispatch call indicator, such as a light emitting diode (LED) or a tone generator, included in the destination PP. Activation of the dispatch call indicator alerts a user of the destination PP to the setup of the dispatch call.

In general, the present invention provides for an originating PP (i.e., PP 101) to originate a dispatch communication with other members of a dispatch group (i.e., destination PP's 102 and 103) that includes the originating PP in a cordless communication system. Originating PP 101 selects an available traffic bearer based on a signal quality metric determination and requests reservation of the selected traffic bearer from FP 105. FP 105 confirms the reservation of the selected traffic bearer to PP 101. FP 105 further informs the other members of the dispatch group (i.e., PP's 102, 103) via a dummy bearer and the selected traffic bearer of the reservation of the selected traffic bearer. PP's 102 and 103 then tune to the selected traffic bearer and PP 101 may begin transmitting to PP's 102 and 103.

In one embodiment, the setting up of the dispatch communication does not require any signaling from the destination PP's. However, in another embodiment, reservation of the selected traffic bearer is not confirmed until at least one destination PP 102, 103 acknowledges receipt of the paging message. By providing for acknowledgments from the destination PP's 102, 103, the user of the originating PP 101 can be provided with a list of the other participants in the dispatch call.

When the user of originating PP 101 is finished transmitting on the reserved traffic bearer, the user of originating PP 101 releases the PTT key. Release of the PTT key initiates a dispatch release sequence that frees up the reserved traffic bearer and allows any user of a PP 101–103 participating in the call the opportunity to reserve the traffic bearer for communication with the group.

Figure 7:
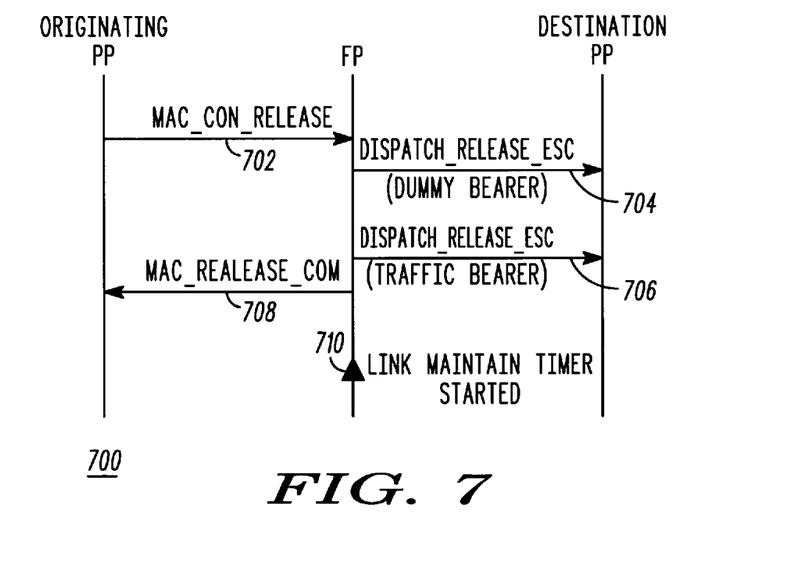
FIG. 7 is a signal flow diagram of a dispatch call release sequence performed by the cordless communication system of FIG. 1 in accordance with the present invention.

FIG. 7 is a signal flow diagram of a dispatch release sequence 700 performed by cordless system 100 in accordance with an embodiment of the present invention. The sequence begins when the user of PP 101 releases the PTT key. Release of the PTT key causes the NWK layer of PP 101 to generate a message, preferably a CC RELEASE message, that informs of the release of the reserved traffic bearer by the PP. The CC RELEASE message is conveyed to the MAC layer of PP 101, which translates the release message to a MAC CON RELEASE message and conveys 702 the MAC CON RELEASE message to the MAC layer of FP 105.

Upon receiving the MAC CON RELEASE message, the MAC layer of FP 105 releases the reserved traffic bearer from the reservation of the bearer by PP 101. FP 105, preferably the DLC layer of FP 105, also generates a paging message, preferably a DISPATCH RELEASE ESC message, informing of the release of the traffic bearer. The DLC layer conveys the DISPATCH RELEASE ESC message to the MAC layer of FP 105, and the MAC layer broadcasts 704 the message to destination PP's 102, 103 via the dummy bearer. Preferably, each PP 101–103 of cordless system 100 that is involved in an active dispatch call continues to listen to the dummy bearer in addition to a reserved traffic bearer for the duration of the PP's participation in the dispatch call. The MAC layer of FP 105 also broadcasts 706 a modified DISPATCH RELEASE ESC message via the reserved traffic bearer, which modified DISPATCH RELEASE ESC message includes the PP identifiers of each destination PP participating in the dispatch call and informs of the release of the reserved traffic bearer by PP 101.

Upon release of the reserved traffic bearer from the reservation by PP 101, FP 105, preferably the NWK layer of FP 105 generates a message, preferably a CC RELEASE COM message, informing that the reserved traffic bearer has been released by PP 101. The NWK layer conveys the CC RELEASE COM message to the MAC layer of FP 105. The MAC layer translates the CC RELEASE COM message to a MAC RELEASE COM message and conveys 708 the MAC RELEASE COM message to the MAC layer of PP 101 via the traffic bearer. Upon receiving the MAC RELEASE COM message, PP 101 releases the reserved traffic bearer, changes from a transmit mode to a receive mode, and listens to the reserved traffic bearer.

In one embodiment of the present invention, after originating PP 101 releases the reserved traffic bearer, FP 105 maintains 710 the reservation of the reserved traffic bearer for use by any member of the dispatch group for a predetermined period of time. By maintaining the reservation of the reserved traffic bearer for the dispatch call beyond the point of release of the bearer by originating PP 101, the setup time for a dispatch group member PP 101–103 desirous of transmitting on the reserved traffic bearer is minimized. That is, the traffic bearer has already been reserved for use by the dispatch group and each member of the dispatch group is already in a receive mode and is listening to the reserved traffic bearer. A user of a PP 101–103 who is desirous of transmitting on the reserved traffic bearer then reserves the traffic bearer for his/her own transmissions by depressing the PTT key on the PP. Similar to signal flow diagram 400, depression of the PTT key causes the PP to convey a MAC CON REQ message to FP 105. Upon receiving the MAC CON REQ message, FP 105 conveys a DISPATCH ESC messages to the dispatch group via the dummy and reserved traffic bearers and conveys a MAC CON CFM message to the PP authorizing the PP to transmit on the reserved traffic bearer.

In another embodiment of the present invention, FP 105 does not maintain the reserved traffic bearer beyond the bearer's release by originating PP 101. In the alternative embodiment, each PP that was involved in the receive side of the dispatch call returns to listening to the dummy bearer when the traffic bearer is released. When a user of a PP 101–103 that was involved in the dispatch communication wishes to respond, a new dispatch call is initiated and a new traffic bearer is reserved as described above.

By providing for a dispatch group in a cordless communication system 100, for an originating PP to reserve a traffic bearer when it wishes to engage in a dispatch call with other members of the dispatch group, for identifying the reserved traffic bearer to the other members of the dispatch group, which other members then tune to the reserved traffic bearer, and for the release of the traffic bearer by the originating PP when the originating PP is finished transmitting, a dispatch call is established in system 100. The dispatch call permits one PP in a system 100 that includes multiple PP's to directly communicate with another PP in the system without transmitting user information via the FP 105. Furthermore, the dispatch call permits each member of the dispatch group to simultaneously communicate with each of multiple other members of the dispatch group.

Figure 8:
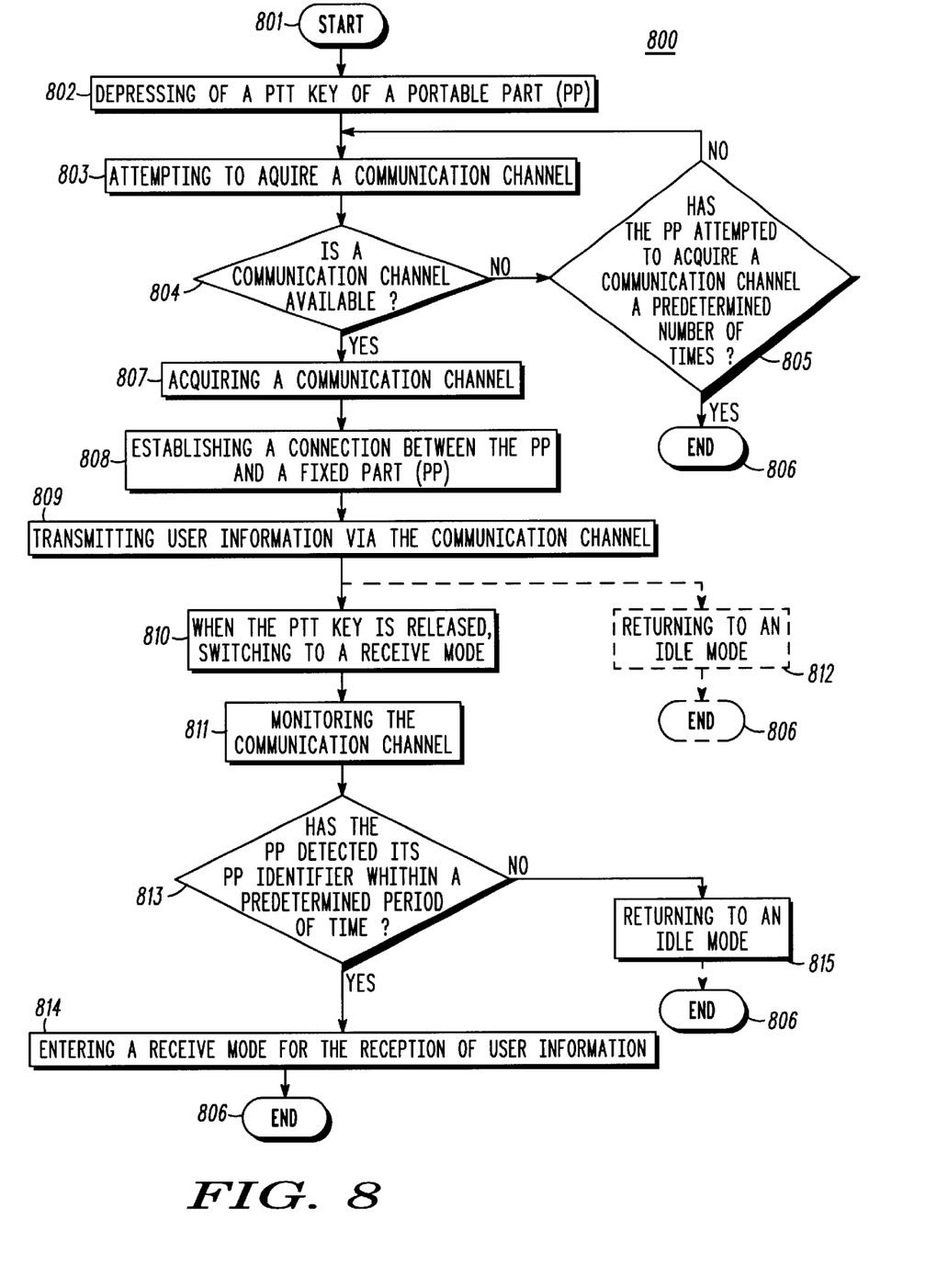
FIG. 8 is a logic flow diagram of the steps executed by a portable part in order to engage in a dispatch call in accordance with an embodiment of the present invention.

FIG. 8 is a logic flow diagram 800 of the steps executed by a PP in order to engage in a dispatch call in accordance with an embodiment of the present invention, wherein the originating PP is one of multiple PP's included in a dispatch group. Initially, the PP is in is in an idle mode, wherein the PP monitors the dummy bearer and conserves battery power. The logic flow begins (801) when a PTT key of the PP is depressed (802). In response to the depression of the PTT key, the PP attempts (803) to reserve a traffic bearer. When no traffic bearer is available (804), the PP reattempts (805) to reserve the traffic bearer a predetermined number of times. In an alternative embodiment, the PP repeatedly attempts to reserve a traffic bearer within a predetermined time period. When the PP fails to reserve (805) a traffic bearer after reattempting the predetermined number of times, or alternatively fails to reserve a traffic bearer within the predetermined time period, the logic flow ends (806).

When a traffic bearer is available (804), the PP reserves (807) the traffic bearer and a connection is established (808) between the PP and an FP. The FP then transmits a paging message on the dummy bearer to the other PP's included in the dispatch group, which paging message identifies the reserved traffic bearer and the other dispatch group members and requests that the other PP's tune to the reserved traffic bearer. The originating PP then transmits (809) user information via the reserved traffic bearer.

When the PTT key is released, the PP switches (810) to a receive mode and monitors (811) the reserved traffic bearer for a unique PP identifier associated with the PP. However, in an alternative embodiment, when the PTT key is released the PP returns (812) to an idle mode and the logic flow ends (806). When, in the course of monitoring the reserved traffic bearer, the PP detects (813) its PP identifier on the reserved traffic bearer, the PP enters a receive mode (814) for the reception of user information and the logic flow ends (806). When the PP fails to detect (813) its PP identifier within a predetermined period of time, the PP returns (815) to an idle mode and the logic flow ends (806).

Figure 9:
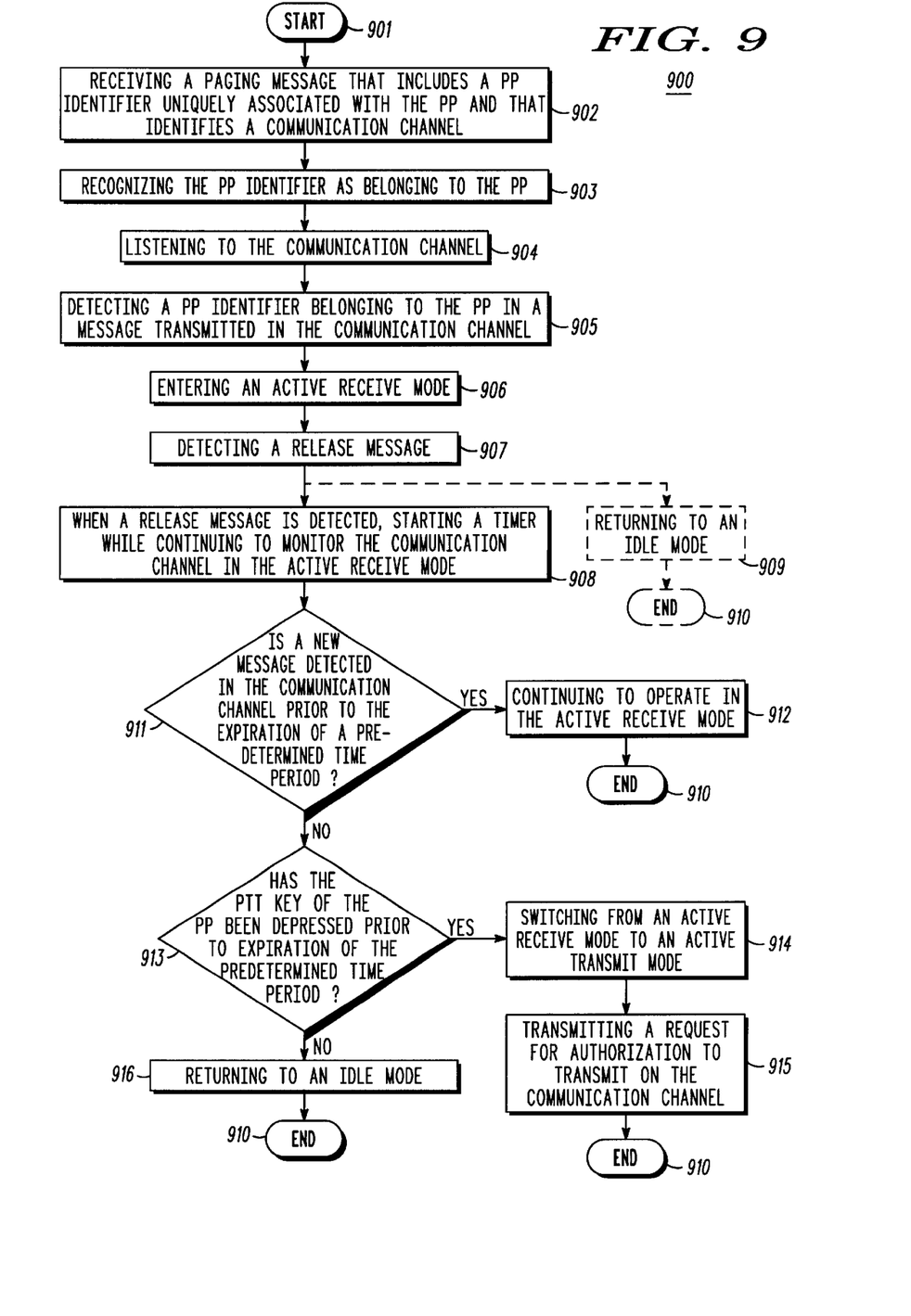
FIG. 9 is a logic flow diagram of the steps executed by a portable part in order to engage in a dispatch call in accordance with another embodiment of the present invention.

FIG. 9 is a logic flow diagram 900 of the steps executed by a PP in order to engage in a dispatch call in accordance with another embodiment of the present invention, wherein the PP is one of multiple PP's included in a dispatch group. Initially, the PP is in is in an idle mode, wherein the PP monitors the dummy bearer and conserves battery power. The logic flow begins (901) when the PP receives (902) a paging message via a dummy bearer allocated for paging messages. The paging message includes a PP identifier uniquely associated with the PP and identifies a traffic bearer reserved for a dispatch communication. The PP recognizes (903) its PP identifier and then listens (904) to the reserved traffic bearer. When the PP detects (905) its PP identifier in a message transmitted in the reserved traffic bearer, the PP enters an active receive mode (906) for the reception of user information.

The PP remains in the active receive mode, listening to the reserved traffic bearer, until the PP detects (907) a release message. In one embodiment, when the release message is detected (907), the PP starts (908) a timer and continues monitoring the reserved traffic bearer in the active receive mode. In another embodiment, when the release message is detected (907), the PP returns (909) to the idle mode and the logic flow ends (910). When, prior to the expiration of a predetermined period of time, the PP fails to detect (911) a new message in the reserved traffic bearer that includes the PP identifier of the PP, and the PP's PTT key is not depressed (913), the PP returns (915) to the idle mode and the logic flow ends (910). When the PP detects (911) a new message in the reserved traffic bearer that includes the PP's PP identifier prior to the expiration of the timer, then the PP continues operating (912) in the active receive mode and awaits user information, and the logic flow ends (910). When the PP's PTT key is depressed (913) prior to the expiration of the predetermined time period and prior to detecting the new message in the reserved traffic bearer, the PP switches (914) from an active receive mode to an active transmit mode. The PP then transmits (915) a request for authorization to transmit on the reserved traffic bearer, and the logic flow ends (910).

Figure 10:
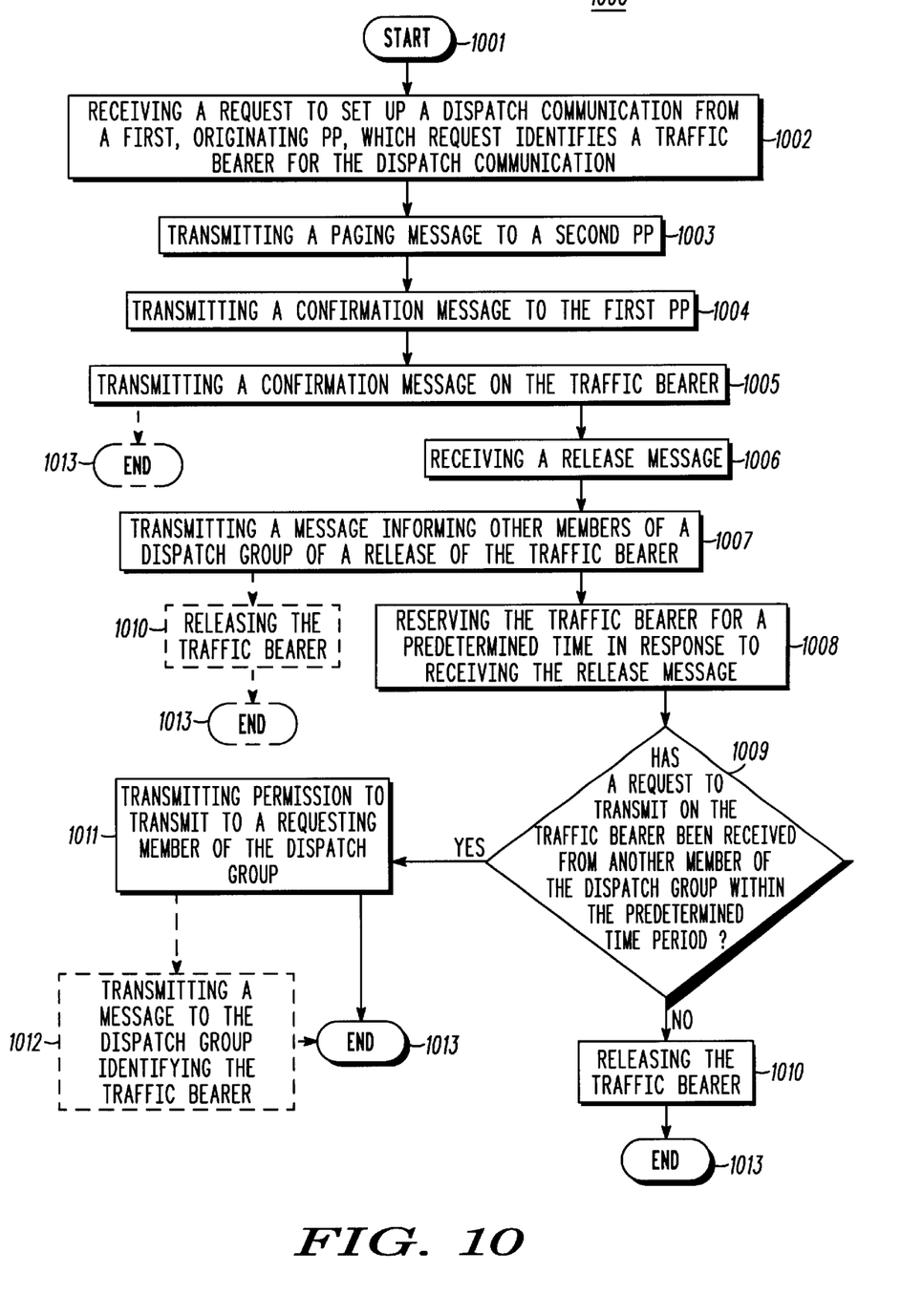
FIG. 10 is a logic flow diagram of the steps executed by a fixed part in order to provide dispatch services in accordance with another embodiment of the present invention.

FIG. 10 is a logic flow diagram 1000 of the steps executed by an FP of a cordless telephone communication system in providing dispatch services in accordance with yet another embodiment of the present invention, wherein the PP is one of multiple PP's included in a dispatch group. The logic flow begins (1001) when the FP receives (1002) a request to set up a dispatch communication from an originating PP. Preferably the originating PP transmits the request in response to the depression of a PTT key by a user of the PP. Included in the request is an identification of a traffic bearer for the dispatch communication and a dispatch group identifier or one or more PP identifiers corresponding to each of one or more members (i.e., PP's) of a dispatch group.

In response to receiving the request, the FP transmits (1003) a paging message, preferably via a dummy bearer, to a second PP. The paging message identifies the traffic bearer and includes the dispatch group identifier or the one or more PP identifiers. In the event that the FP receives a group identifier from the originating PP, the FP may translate the dispatch group identifier to one or more PP identifiers associated with the dispatch group identifier by reference to a registration database. The registration database stores the PP identifiers of each PP included in the communication system and further stores one or more dispatch group identifiers and the corresponding PP identifiers of the PP's that are members of each group. When the FP translates the dispatch group identifier to the one or more associated PP identifiers, the FP transmits the one or more PP identifiers, instead of the dispatch group identifier, in the paging message. The FP also transmits (1004) a confirmation message to the first PP, wherein the confirmation message authorizes the first PP to transmit on the traffic bearer, and transmits (1005) a message via the traffic bearer confirming the use of the traffic bearer for the dispatch communication.

When the user of the originating PP releases the PTT key, the originating PP transmits a release message informing of a release of the traffic bearer by the originating PP. The FP receives (1006) the release message and transmits (1007) a message, preferably via the paging channel or alternatively via the traffic channel, informing the other members of the dispatch group of the release of the traffic bearer. In one embodiment of the present invention, the FP also releases (1010) the traffic bearer and the logic flow ends (1013). In another embodiment of the present invention, the FP then reserves (1008) the traffic bearer for a predetermined time in response to receiving the message informing of the release of the traffic bearer. When no request to transmit on the traffic bearer is received (1009) from a member of the dispatch group, including the originating PP, during the predetermined time period, the FP releases (1010) the traffic bearer and the logic flow ends (1013). When a request to transmit on the traffic bearer is received (1009) from a member of the dispatch group during the predetermined time period, the FP transmits (1011) permission to transmit in the traffic bearer to a PP sourcing of the request. In an alternative embodiment of the present invention, when a request to transmit is received during the predetermined time period, the FP also transmits (1012) a paging message to the dispatch group identifying the traffic bearer. The logic flow then ends (1013). The paging message may also include the dispatch group identifier or individual dispatch group PP identifiers. In other embodiments of the present invention, the FP may perform only steps (1002)–(1005), steps (1006), (1007) and (1010), or steps (1006)–(1012).

Figure 11:
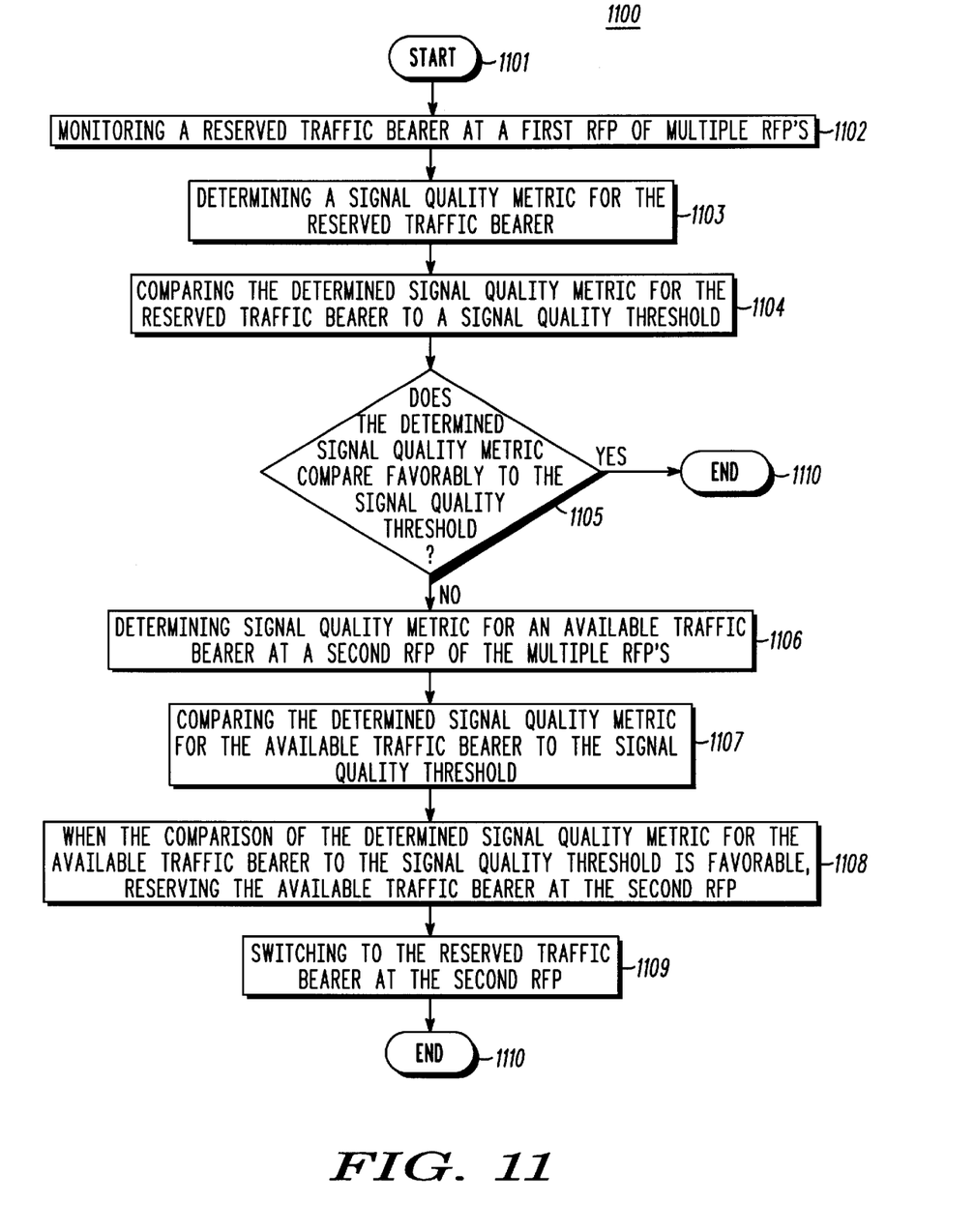
FIG. 11 is a logic flow diagram of the steps executed in arranging a handoff of a dispatch call in accordance with another embodiment of the present invention.

In still another embodiment of the present invention, wherein an FP includes multiple RFP's that include a first RFP that services a PP and a second, non-servicing RFP, the PP arranges for a handoff of the dispatch call from the first RFP to the second RFP when a signal quality metric determined with respect to the reserved traffic bearer falls to an unacceptable level. FIG. 11 is a logic flow diagram 1100 of the steps performed by the PP in arranging the handoff. The logic flow begins (1101) when the PP monitors (1102), and determines (1103) a signal quality metric for, the reserved traffic bearer. Preferably, the PP intermittently monitors and determines signal quality metrics with respect to the reserved traffic bearer so long as the PP continues to be service by the first RFP.

The PP compares (1104) a most recently determined signal quality metric for the reserved traffic bearer to a signal quality threshold, preferably a minimum acceptable C/I, that is stored in a memory of the PP. When the PP determines (1105) that the signal quality metric for the reserved traffic bearer compares favorably with the signal quality threshold, such as exceeding a minimum acceptable C/I, then the logic flow ends (1110). When the PP determines (1105) that the signal quality metric for the reserved traffic bearer compares unfavorably with the signal quality threshold, such as falling below the minimum acceptable C/I, then the PP arranges for a handoff of the dispatch call to the second RFP if an acceptable traffic bearer is available at the second RFP.

In arranging for a handoff, the PP determines (1106) a signal quality metric for an available traffic bearer at the second RFP and compares (1107) the determined signal quality metric to the signal quality threshold. When the comparison is favorable, the PP reserves (1008) the traffic bearer at the second RFP and switches (1109) to the reserved traffic bearer at the second RFP, and the logic flow ends (1110).

Preferably the step of determining (1106) a signal quality metric for an available traffic bearer at the second RFP includes the following steps. The PP determines a signal quality metric for a signal transmitted by the second RFP, such as a signal in a traffic bearer or a dummy bearer or any communication channel. The PP compares the signal quality metric to the signal quality threshold, and when the comparison is favorable, determines a signal quality metric for each available traffic bearer at the second RFP. The step of comparing (1107) preferably includes comparing each determined signal quality metric to the signal quality threshold, and the step of reserving (1108) preferably includes steps of selecting a traffic bearer at the second RFP that corresponds to the most favorable determined signal quality metric, requesting reservation of the selected traffic bearer from the second RFP, and receiving confirmation of the reservation from the second RFP.

Preferably the step of switching (1109) includes the following steps. Upon receiving the confirmation from the second RFP, the PP conveys a bearer handoff request to each of the first and second RFP's. The bearer handoff request informs each RFP of the PP's intention to switch traffic bearers. The PP then switches from transmitting in the traffic bearer reserved at the RFP currently servicing the PP to transmitting in the traffic bearer reserved at the newly selected RFP, preferably temporarily transmitting in both traffic bearers before completing the switch. The PP then conveys a release message to the former RFP releasing the reserved traffic bearer there.

Figure 12:
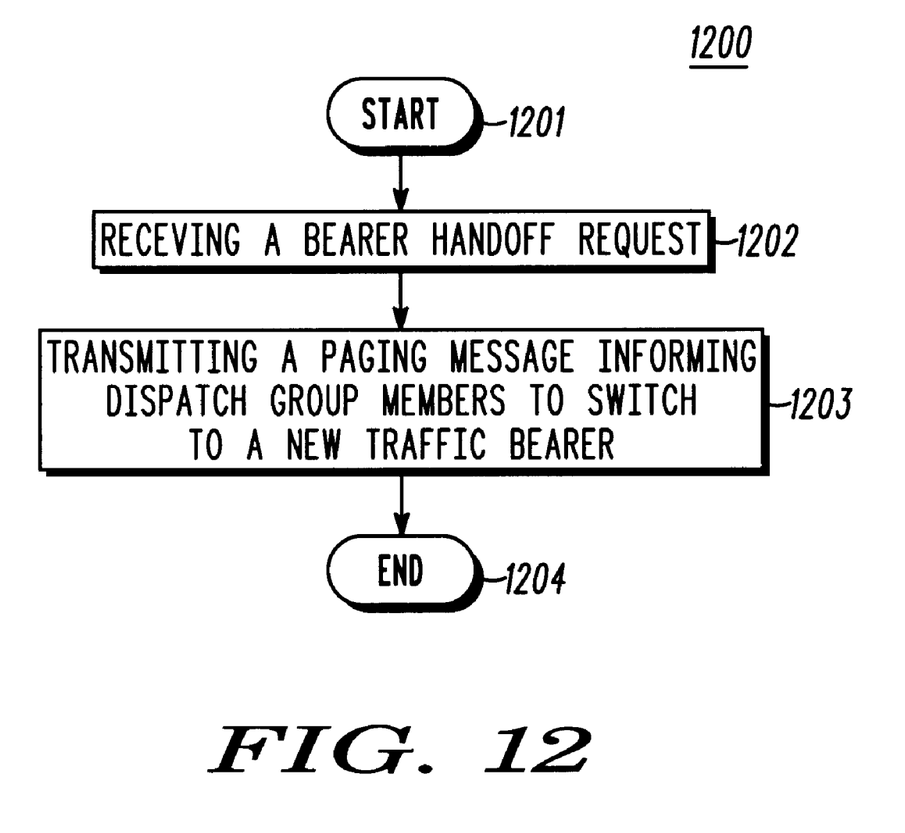
FIG. 12 is a logic flow diagram of the steps executed in arranging a handoff of a dispatch call in accordance with another embodiment of the present invention.

FIG. 12 is a logic flow diagram 1200 of the steps performed by an FP having one or more RFP's in arranging for a handoff in a dispatch communication. The logic flow begins (1201) when the FP receives (1202) a bearer handoff request from a PP requesting a handoff to a new traffic bearer. Preferably the new traffic bearer is identified in the bearer handoff request and may be an unused traffic bearer at the RFP currently servicing the PP or may be an unused traffic bearer at a new RFP. The FP transmits (1203) a paging message to the dispatch group members, preferably via the dummy bearer, informing the members to switch to the traffic bearer reserved at the newly selected RFP, and the logic flow ends (1204).

In sum, the present invention provides for the establishment of a dispatch call in a cordless communication system 100. Dispatch groups that include multiple PP's (e.g., PP's 101–103) in system 100 are established and stored in the system. When one member of a group (e.g., PP 101) desires to engage in a dispatch communication, the member selects a traffic bearer over which to transmit, reserved the selected traffic bearer via FP 105, and identifies the reserved traffic bearer to the other members of the dispatch group (e.g., PP's 102, 103) via FP 105. The other members tune to the identified traffic bearer and the originating PP begins transmitting. When the originating PP is finished transmitting, the originating PP releases the reserved traffic bearer and another member of the dispatch group can then use the reserved traffic bearer for a transmission. The present invention further provides for the handoff of a traffic bearer in the event that the signal performance of the reserved traffic bearer degrades to an unacceptable level and a better, acceptable bearer is available.

While the present invention has been particularly shown and described with reference to particular embodiments thereof, it will be understood by those skilled in the art that various changes in form and details may be made therein without departing form the spirit and scope of the present invention.

What is claimed is:

1. In a cordless communication system comprising a plurality of communication units, a method for providing dispatch services comprising steps of:
   receiving a request to set up a dispatch communication from a first communication unit of the plurality of communication units, wherein the request identifies a traffic bearer for the dispatch communication;
   transmitting a paging message to a second communication unit of the plurality of communication units, wherein the paging message identifies the traffic bearer;
   transmitting a confirmation message to the first communication unit, wherein the confirmation message authorizes the first communication unit to transmit on the traffic bearer; and transmitting a message via the traffic bearer confirming the use of the traffic bearer for the dispatch communication.

2. The method of claim 1, wherein the request to setup a dispatch communication includes an identifier associated with the second communication unit.

3. The method of claim 1, wherein the paging message is transmitted via a dummy bearer.

4. The method of claim 1, wherein the step of transmitting a paging message further comprises the step of transmitting a paging message including an identifier of the second communication unit.

5. The method of claim 1, further comprising steps of:
receiving a message informing of a release of the traffic bearer by the first communication unit; and
releasing the reserved traffic bearer.

6. The method of claim 1, wherein the traffic bearer comprises a first traffic bearer, and further comprising steps of:
receiving a request to handoff an active dispatch communication from the first traffic bearer to a second traffic bearer; and
transmitting a paging message, wherein the paging message identifies the second traffic bearer.

7. A method for providing dispatch services comprising steps of:
receiving a message informing of a release of the traffic bearer by a first communication unit;
transmitting a message to a second communication unit informing of the release of the traffic bearer in response to receiving the message informing of the release of the traffic bearer;
reserving the traffic bearer for a predetermined time period in response to receiving the message informing of the release of the traffic bearer;
when no request to transmit on the traffic bearer is received during the predetermined time period, releasing the traffic bearer; and
when a request to transmit on the traffic bearer is received during the predetermined time period from the second communication unit, transmitting permission to transmit in the traffic bearer to the second communication unit.

8. The method of claim 7, further comprising a step of transmitting a paging message to the first communication unit, wherein the paging message identifies the traffic bearer, when a request to transmit on the traffic bearer is received during the predetermined time period from the second communication unit.

9. In a cordless telephone system comprising a plurality of communication units, a method for engaging a first communication unit of the plurality of communication units in a dispatch call with a second communication unit of the plurality of communication units, the method comprising steps of:
transmitting a request to set up a dispatch call, wherein the request identifies a traffic bearer for the dispatch communication;
receiving an authorization to engage in a dispatch communication on the traffic bearer in response to transmitting the request; and
transmitting on the traffic bearer in response to receiving the authorization.

10. The method of claim 9, wherein the step of transmitting a request further includes transmitting a request having an identifier associated with the second communication unit.

11. The method of claim 9, wherein the step of receiving an authorization comprises steps of:
a) waiting a predetermined period of time after transmitting the request for an authorization to engage in a dispatch communication;
b) when the authorization is not received prior to the expiration of the predetermined period of time, retransmitting the request;
c) waiting the predetermined period of time after retransmitting the request for the authorization to engage in a dispatch communication;
d) repeating steps (b) and (c) a predetermined number of times or until the authorization is received, whichever shall first occur; and
e) when no authorization is received after repeating step a. and b. the predetermined number of times, terminating efforts to reserve the traffic bearer.

12. The method of claim 9, wherein the step of receiving an authorization comprises steps of:
a) waiting a predetermined first period of time after transmitting the request for an authorization to engage in a dispatch communication;
b) when the authorization is not received prior to the expiration of the predetermined first period of time, retransmitting the request;
c) waiting the first predetermined period of time after retransmitting the request for the authorization to engage in a dispatch communication;
d) repeating steps (b) and (c) until the expiration of a predetermined second period of time or until an authorization is received, whichever shall first occur; and
e) when no confirmation is received prior to the expiration of the predetermined second period of time, terminating efforts to reserve the traffic bearer.

13. The method of claim 9, further comprising steps of: transmitting a message releasing the traffic bearer; and entering an idle mode.

14. The method of claim 9, further comprising steps of: transmitting a message releasing the traffic bearer; and listening to the traffic bearer.

15. The method of claim 14, further comprising steps of:
receiving a message via the traffic bearer, wherein the message comprises an identifier associated with the first communication unit; and
entering an active receive mode in response to receiving the message.

16. The method of claim 14, wherein the step of listening to the traffic bearer comprises a step of listening, by a communication unit of the multiple communication units, to the traffic bearer for a predetermined period of time, and further comprising a step of entering an idle mode when the communication unit fails receive a message comprising an identifier associated with the communication unit during the predetermined period of time.

17. The method of claim 9, wherein the traffic bearer comprises a first traffic bearer, and wherein the method further comprises steps of:
determining a signal quality metric corresponding to the first traffic bearer to produce a first signal quality metric;
comparing the first signal quality metric to a signal quality threshold;

determining a signal quality metric corresponding to a second traffic bearer to produce a second signal quality metric;

comparing the second signal quality metric to a signal quality threshold; and when the first signal quality metric compares unfavorably with the signal quality threshold and the second signal quality metric compares favorably with the signal quality threshold, requesting a reservation of the second traffic bearer for the communication between the first and second communication units.

18. In a cordless telephone system comprising a plurality of communication units, a method for engaging a communication unit of the plurality of communication units in a dispatch communication, the method comprising steps of:

listening to a dummy bearer allocated for paging messages;

receiving a paging message identifying a traffic bearer that is reserved for a dispatch communication; and listening to the traffic bearer in response to receiving the paging message.

19. The method of claim 18, wherein the step of receiving a paging message includes receiving a paging message having an identifier associated with the communication unit.

20. The method of claim 18, further comprising steps of:

receiving a message releasing the traffic bearer;

transmitting a request to transmit on the traffic bearer;

receiving authorization to transmit on the traffic bearer; and transmitting a message via the traffic bearer in response to receiving authorization to transmit.

21. The method of claim 18, further comprising steps of:

receiving a message releasing the traffic bearer;

entering an idle mode in response to receiving the message releasing the traffic bearer.

22. The method of claim 18, further comprising steps of:

receiving a message releasing the traffic bearer;

listening to the traffic bearer for a predetermined period of time in response to receiving the message releasing the traffic bearer;

entering an idle mode when the communication unit fails to receive a message that comprises an identifier associated with the communication unit prior to the expiration of the predetermined period of time.

23. The method of claim 18, further comprising a step of receiving, via the traffic bearer, a confirmation of the reservation of the traffic bearer for a dispatch communication.

24. The method of claim 23, further comprising the step of entering an active receive mode in response to receiving the confirmation.

25. The method of claim 24, further comprising steps of:

receiving a message releasing the traffic bearer;

listening to the traffic bearer for a predetermined period of time in response to receiving the message releasing the traffic bearer;

maintaining an active receive mode when the communication unit receives a message comprising an identifier associated with the communication unit prior to the expiration of the predetermined period of time.

26. The method of claim 24, further comprising steps of:

receiving a message releasing the traffic bearer;

switching from an active receive mode to an active transmit mode in response to receiving a message releasing the traffic bearer; and transmitting a request for authorization to transmit on the traffic bearer.

27. A cordless communication system comprising:

a plurality of portable parts comprising:

a first portable part of the plurality of portable parts that transmits a request to set up a dispatch call, wherein the request identifies a traffic bearer for the dispatch communication, receives an authorization to engage in a dispatch communication on the traffic bearer in response to transmitting the request, and transmits on the traffic bearer in response to receiving the authorization;

a second portable part that listens to a dummy bearer allocated for paging messages, receives a paging message identifying the traffic bearer, and listens to the traffic bearer in response to receiving the paging message; and a fixed part in wireless communication with each portable part of the plurality of portable parts that receives the request to set up a dispatch communication from the first portable part, transmits the paging message to the second portable that identifies the traffic bearer, transmits a confirmation message to the first portable part that authorizes the first portable part to transmit on the traffic bearer, and transmits a message via the traffic bearer confirming the use of the traffic bearer for the dispatch communication.

* * * * *